United States Patent
Baur et al.

(10) Patent No.: US 6,924,624 B2
(45) Date of Patent: Aug. 2, 2005

(54) METHOD AND APPARATUS FOR SLOWING THE DISCHARGE PROCESS OF A BATTERY

(75) Inventors: Hans-Joachim Baur, Leinfelden-Echterdingen (DE); Stefan Roepke, Leinfelden (DE); Rainer Glauning, Aichtal-Groetzingen (DE); Volker Bosch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/337,801

(22) Filed: Jan. 7, 2003

(65) Prior Publication Data

US 2003/0137279 A1 Jul. 24, 2003

(30) Foreign Application Priority Data

Jan. 24, 2002 (DE) .......................................... 102 02 603

(51) Int. Cl.[7] .................................................. H02J 7/00
(52) U.S. Cl. ...................................... 320/132; 320/135
(58) Field of Search ................................. 320/132, 135, 320/136, 134, 137, 127, 128, 123, 129, 133, 161; 388/937, 921; 307/125, 137, 140; 324/425, 426, 427

(56) References Cited

U.S. PATENT DOCUMENTS

| | | | |
|---|---|---|---|
| 5,410,239 A | * 4/1995 | Yang | 320/134 |
| 5,754,027 A | 5/1998 | Oglesbee et al. | 320/122 |
| 5,783,998 A | 7/1998 | Nakajou et al. | 324/426 |
| 6,271,605 B1 | * 8/2001 | Carkner et al. | 307/125 |
| 6,614,232 B1 | * 9/2003 | Mukai | 324/426 |

FOREIGN PATENT DOCUMENTS

| | | |
|---|---|---|
| DE | 41 06 725 A1 | 9/1992 |
| DE | 38 75 389 T2 | 3/1993 |
| DE | 693 19 049 T2 | 2/1999 |
| EP | 0 448 755 A1 | 10/1991 |
| EP | 0 589 337 A1 | 3/1994 |
| GB | 2 367 780 A | 4/2002 |
| WO | 02/22316 A1 | 3/2002 |

* cited by examiner

Primary Examiner—Donald Sparks
Assistant Examiner—Lawrence Luk
(74) Attorney, Agent, or Firm—Michael J. Striker

(57) ABSTRACT

A battery unit including a battery (3) is equipped with a monitoring circuit (9) for detecting and evaluating operating variables related to charge state of the battery (3). So that energy is not drawn from the battery (3) by its own monitoring circuit (9) when an external load (2) powered by the battery unit is shut off, the supply of electrical power to the monitoring circuit (9) in the battery unit is disconnected, either immediately or after a certain time delay, when the load (2) is shut off. This slows the discharge of the battery (3) when it is not supplying electrical to the load (2).

10 Claims, 2 Drawing Sheets

METHOD AND APPARATUS FOR SLOWING THE DISCHARGE PROCESS OF A BATTERY

BACKGROUND OF THE INVENTION

1. Field of the Invention

The present invention relates to a method and an apparatus for slowing the discharge process of a battery, preferably a battery of a hand tool machine, with the load shut off, in which the battery is equipped with a monitoring circuit evaluating and detecting its operating variables related to the energy supply in or the charge state of the battery.

2. Description of the Related Art

For example, DE 41 06 725 A1 describes an apparatus including a battery equipped with a monitoring circuit, which detects and evaluates the operating variables of the battery. These operating variables include, for example, the temperature of the battery, the charging and discharging currents of the battery under load. This circuit also detects the resting current and the spontaneous discharge of the battery and limits the discharging of the battery at a predetermined limiting voltage, in order to avoid a total discharge that would shorten the life of the battery. The operating variables detected by the circuit can finally be used for control of operation of a load connected to the battery or for control of the charging process at a charge station.

Generally discharging of a battery cannot be avoided, even if it is not under a load due to operation of consumers with it. This discharging process is even accelerated because the evaluation circuit described in DE 41 06 725 A1 continuously draws energy from the battery. Thus it is desirable to slow the discharging of a battery as much as possible so that the battery remains useful for the longest possible time for operation of a load, for example of a hand tool machine. Examples of hand tool machines having such batteries are drills, screwdrivers, hammer drills, grinders, saws, etc.

SUMMARY OF THE INVENTION

It is an object of the present invention to provide a method for slowing down the discharging of a battery and, more particularly, for slowing the discharging of a battery of a hand tool machine, when it is not supplying a load, so that the hand tool machine including the battery is ready for use.

It is another object of the present invention to provide an apparatus for performing the method according to the invention of slowing down discharging of a battery not under load, so that the battery is ready to supply consumers.

According to the invention the method of slowing the discharge of a battery in an electrical energy supply device, when the battery is not supplying a load, preferably a hand tool machine, with electrical energy from the battery, comprises the steps of:

a) providing a monitoring circuit means for detecting and evaluating operating variables of the battery in the electrical energy supply device, which relate to an electrical energy supply in or charge state of the battery;

b) supplying electrical power to the monitoring circuit means in order to operate the monitoring circuit means to detect and evaluate the operating variables; and c) interrupting the electrical power supplied to the monitoring circuit means if the load is shut off so that the electrical power is not supplied to the monitoring circuit means.

The apparatus according to the invention for performing this method comprises monitoring circuit means for monitoring operating variables of the battery, which relate to an electrical energy supply of the battery, the monitoring circuit means being arranged within the electrical energy supply device;

means for supplying the monitoring circuit means with electric power from the battery; and means for disconnecting or interrupting the electric power supplied to the monitoring circuit means if the load is shut off from the electrical energy supplied by the battery.

The apparatus and method according to the invention have the advantage that no energy is drawn from the battery by the monitoring circuit means for detecting and evaluating its charge state or its energy supply when the battery is not under load. Thus the evaluating and detecting circuit does not discharge the battery when the battery is not in use in operation powering the load.

Various preferred embodiments are claimed in the appended dependent claims.

In preferred embodiments of the invention the interruption of power supply of the monitoring circuit means for evaluating and detecting operating variables related to energy supply of the battery may be delayed for a predetermined time interval following shut off of the load or disconnection of it from the battery. Often the load is re-connected to the battery again after only a short time after it is shut off. If the monitoring circuit means of the battery is still not completely shut off, i.e. found in its so-called "sleep mode", the load is rapidly prepared for operation. A wake-up process need not be first performed, i.e. a process in which activation of the monitoring circuit means of the battery occurs.

The deactivation of the battery circuit when the load is shut off can occur in the following manner:

When the load is shut off or disconnected from the battery, shut off information is transmitted to the circuit means, by which the time-delayed or immediate shut off of the circuit means for detecting and evaluating operating variables takes place. In preferred embodiments the power supplied over a conductor leading from the load to the monitoring circuit means can be interrupted at the same time or at a later time after shutting off the load. In this case the supply of power for the circuit means of the battery is conducted via the load to the circuit means from the battery.

It is advantageous to operate the monitoring circuit means of the battery with reduced power from the battery after shutting off the load in some embodiments and next after a predetermined time interval completely shutting off the power supply to the monitoring circuit means. In the case of these embodiments the circuit for monitoring operating variables of the battery is first operated in a so-called "stand-by" mode (operation with reduced energy consumption) and subsequently is put in a "sleep mode" (completely turned off). When the load is again put in operation, while the circuit is in the "stand-by mode", the monitoring circuit means can be more rapidly activated than if it were in the "sleep mode".

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
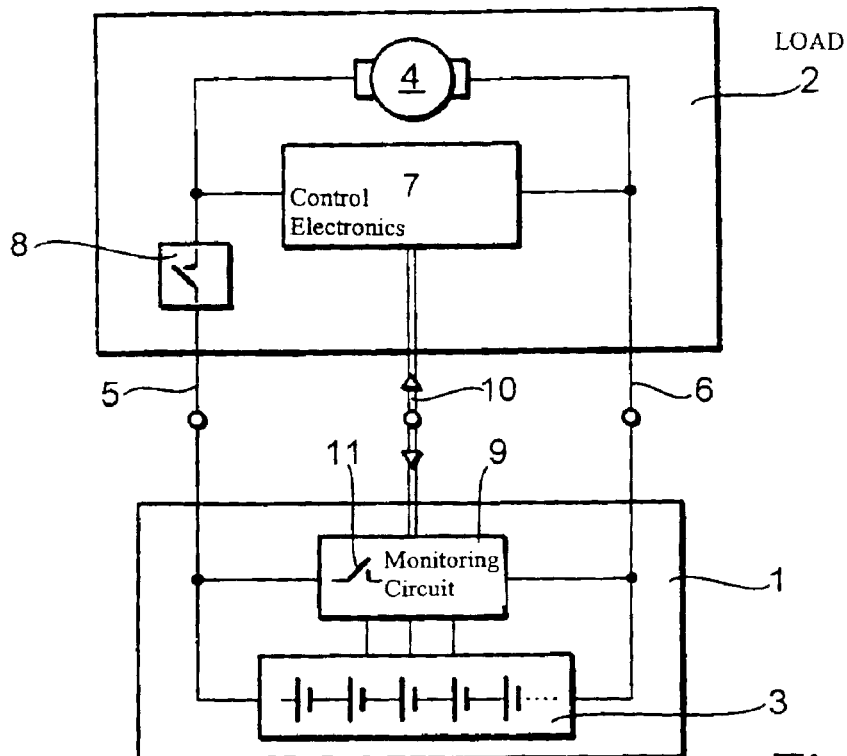
FIG. 1 is a block diagram of a first embodiment of an apparatus according to the invention, which comprises a battery with a battery monitoring circuit means, which are connected with a load, in which the battery monitoring circuit means is supplied with electric power directly from the battery.

FIG. 1 is a block diagram of an apparatus according to the invention comprising a load 2 and an electrical energy supply device 1 for it. The electrical energy supply device 1 includes a battery 3 comprising several battery cells. The load 2 can be an electrical hand tool machine, e.g. a screwdriver, a drill, a hammer drill, a grinder, saw or the like.

The load 2 is an electrically powered hand tool machine, in which the electrical energy consumer is an electric motor 4, which is electrically connected with the electrical energy supply device 1 and particularly with the battery 3, by means of current conductors 4 and 5. The load 2 also includes control electronics 7, which similarly are supplied with electrical power by means of the current conductors 4 and 5 from the electrical energy supply device 1. The control electronics 7 operate to control the electric motor 4, e.g. its power, torque and/or rotation speed, in a known manner. The load 2 also includes a switch 8 arranged in the current conductor 5, which is connected with the electric motor 4 and the control electronics 7, whereby an operator can turn the load 2 off and on. The switch 8 can also comprise means for setting a load variable under control of the operator, e.g. a potentiometer, with which the electrical power consumed by the load 2 is set.

The electrical energy supply device 1 comprises the battery 3 and a monitoring circuit means 9 for detecting and evaluating at least one operating variable of a battery 3. The operating variables are e.g. the temperature or the pressure in one or more battery cells of the battery 3. Additional operating variables include e.g. charging and/or discharging currents, operation hours, available charge capacity and the like. This circuit means 9 can, for example, control a charge indicator of the electrical energy supply device 1 or can limit the discharge of the battery 3 to a predetermined lower limit, in order to avoid total discharge.

The monitoring circuit means 9 in the electrical energy supply device 1 is connected with the control electronics 7 of the load 2 by means of a signal line 10. For example, the circuit means 9 of the electrical energy supply device 1 transmits the actual charge state of the battery 3 to the control electronics 7 of the load 2, so that the power drawn by the load 2 is adjusted, so that the charge state does not drop below the totally discharged level, which would reduce its service life. The signal line 10 can also be used to transmit the operating variables of the electrical energy supply device 1 to a charging device connected to the electrical energy supply device 1 for charging the battery 3 so that the charging process is controlled.

The monitoring circuit means 9 in the electrical energy supply device 1, as shown in the embodiment of FIG. 1, is directly connected to the terminals of the battery 3, to measure its charge state or stored electrical energy.

If the load 2 is turned off by means of the switch 8 or because the load 2 is cut off from the electrical energy supply device 1, the supply of electrical energy to the monitoring circuit means 9, i.e. the circuit means for detection and evaluation of operating variables of the battery 3, should also be shut off. When the monitoring circuit means 9 is shut off, it does not draw energy from the battery 3 in its resting state (cut off from the load 2), which would accelerate the discharge of the battery 3. For this purpose an electrically controllable switch 11 is provided in the monitoring circuit means 9, with which the current supply to the circuit means 9 can be interrupted or shut off. This switch 11 is then opened, when the information that the load 2 has been shut off is transmitted from the control electronics 7 of the load 2 to the circuit means 9 by means of the signal line 10. On shutting off the load 2 the monitoring circuit means 9 of the electrical energy supply device 1 is put in the so-called "sleep-mode".

The sleep mode of the monitoring circuit means 9 can either be activated immediately after shutting off the load or after an appropriate time delay. Since the re-activation of the circuit means 9 from the sleep mode takes a certain amount of time, it is appropriate not to put the circuit means 9 in the sleep mode immediately after shutting off the load 2. This is the case since often the load 2 is immediately turned on again after a short time. If there is no such delay in putting the circuit means in the sleep mode after load shut off, there would be an uncomfortably long delay in re-activating the circuit means 9. When the circuit means 9 of the electrical energy supply device 1 is put in the sleep mode, the reactivation of the circuit means 9 takes place e.g. when the switch 11 is closed again. When that happens the control electronics 7 of the load 2 signals the circuit means over the signal line 10 that either the electrical energy supply device 1 is plugged into the load module or the switch 8 is closed again turning on the load 2.

Figure 2:
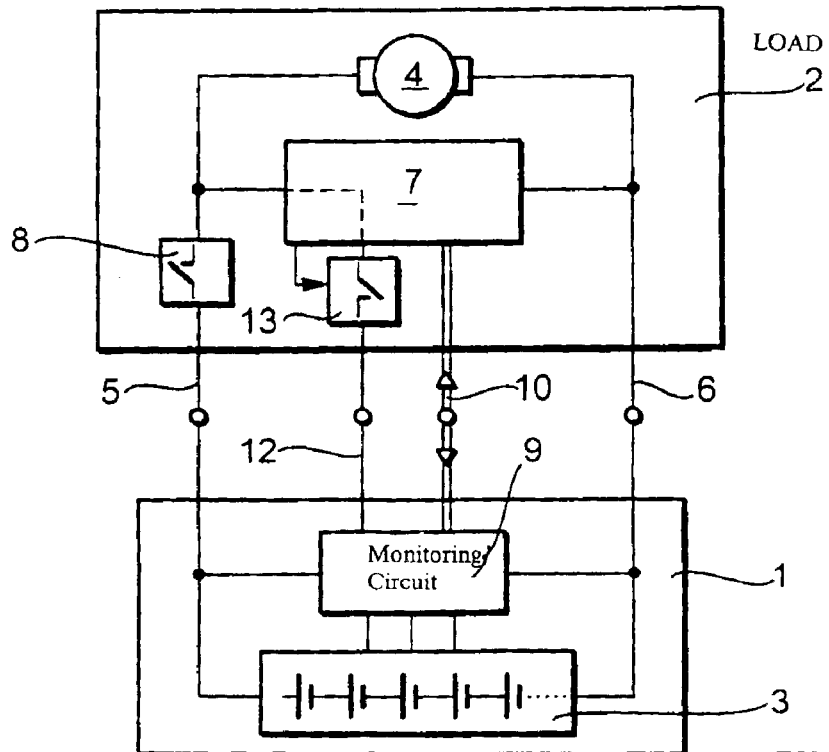
FIG. 2 is a block diagram of a second embodiment of an apparatus according to the invention, which comprises a battery with a battery monitoring circuit means, in which electric power is supplied via the load over a special conductor.
Figure 3:
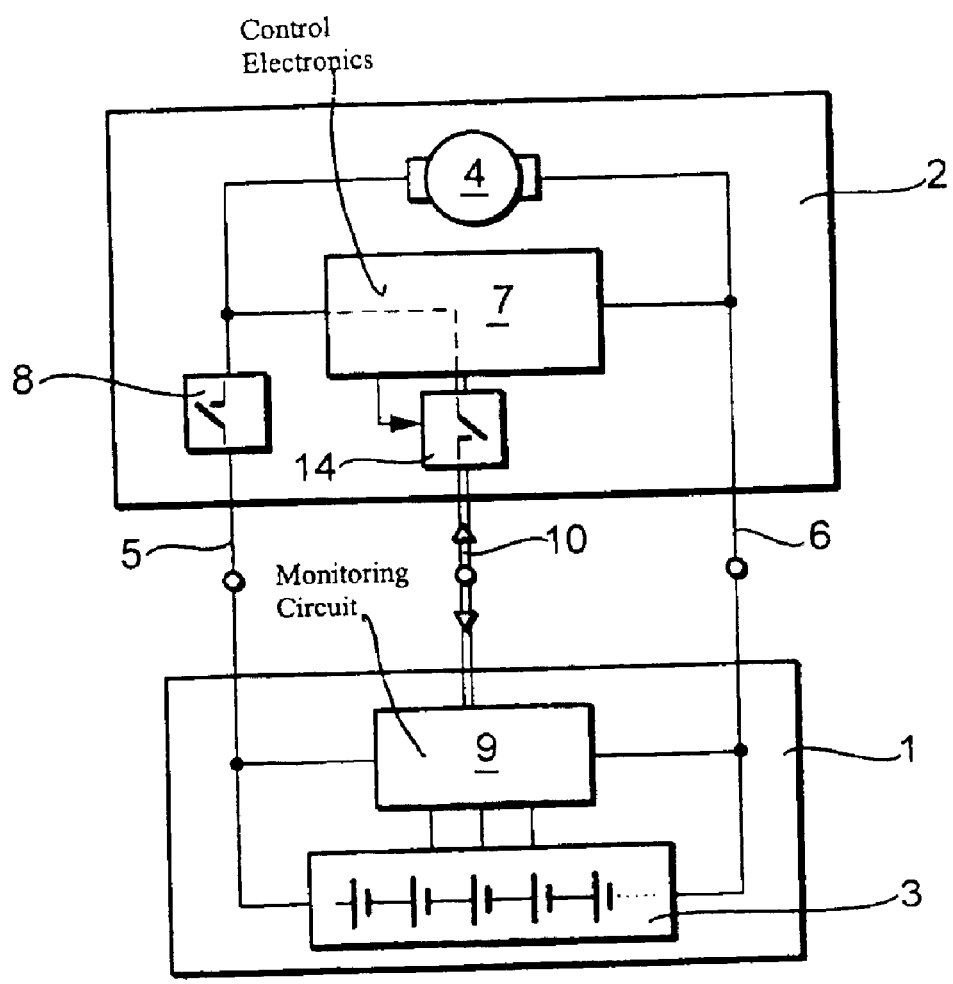
FIG. 3 is a block diagram of a third embodiment of an apparatus according to the invention, which comprises a battery with a battery monitoring circuit means, whose power supply occurs via the load, in which the electric power for the circuit means is conducted over a conductor according to information transmitted between the circuit means and the load.

FIGS. 2 and 3 show additional embodiments of an apparatus in which the monitoring circuit means 9 for the battery 3 can be put in the sleep mode when the load 2 is shut off. In FIGS. 2 and 3 the apparatus has switching elements, whose function have already been described in connection with the embodiment of FIG. 1, designated with the same reference numbers.

In the embodiment according to FIG. 2 the monitoring circuit means 9 of the battery 3 is not directly supplied with power from the cells of the battery 3, but via the load 2. Thus the circuit means 9 is connected with the load by means of a current conductor 12, which, in turn, is of course connected electrically with the current conductor 5 supplying the load 2 with current from the battery 3, as shown by the dashed line in FIG. 2. Another switch 13 is inserted in the current conductor 12 between the control electronics 7 of the load and the circuit means 9. The control electronics 7 controls this other switch 13. This other switch 13 is opened when the load 2 is switched off, so that the monitoring circuit means 9 of the electrical energy supply device 1 is put in the sleep mode. The opening of the other switch 13, can, as already mentioned above, take place either immediately after the load 2 is shut off or after a predetermined time delay after disconnecting the load 2 from the electrical energy supply device 1.

Alternatively in another embodiment shown in FIG. 3 the power supplied to the monitoring circuit means 9 of the electrical energy supply device 1 occurs from the load 2 via the signal line 10. Then no additional current conductor 12 is required between the control electronics 7, the load 2 and the monitoring circuit means 9 of the electrical energy supply device 1. Instead of the switch 13 in the current conductor 12 (see FIG. 2), in the embodiment of FIG. 3 a further switch 14 is provided in the signal line 10. This further switch 14 has the same function as the switch 13 in FIG. 2. The further switch 14 and/or the switch 13 are integrated appropriately in the control electronics 7.

It is understandably important to put the circuit means 9 of the electrical energy supply device 1 in the sleep mode after shutting off the load 2, i.e. to completely shut off the circuit means 9 from the current supply of the battery 3. Then when the load 2 is again switched on, a certain time interval is required in order to active the monitoring circuit means 9 from its sleep mode. Because of that an undesirable waiting time for operation results until the apparatus is again completely operable. This waiting time may be considerably shortened so that after turning off the load 2 the circuit means 9 in the electrical energy supply device 1 is not completely turned off, but operated with reduced power for a predetermined time interval after load shut off. Then the switches 11, 13, 14 in the embodiments shown in FIGS. 1 to 3 do not have simple switching function, but after load shut off, they act to first reduce the power supplied to the circuit means 9 to a predetermined small value. This small value is sufficient to maintain the operation of the circuit means 9, also with delayed reaction time. When this stand-by-mode is active for a certain time period and in the meantime the load is not switched on again, the stand-by-mode is converted into the sleep mode. From the stand-by-mode the load is switched on again quickly when the load is turned on since the circuit means for evaluation and detection of operating variables commences operations without significant delay.

The disclosure in German Patent Application 102 02 603.3 of Jan. 24, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for slowing discharge of a battery, especially a battery of a hand tool machine, not under load, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of slowing the discharge of a battery (3) in an electrical energy supply device (1), when said electrical energy supply device is not operating to supply a load (2) with electrical energy from the battery (3), said method comprising the steps of:
   a) providing a monitoring circuit means (9) for detecting and evaluating operating variables of the battery (3) said operating variables relating to an electrical energy supply in the battery (3), wherein said electrical energy supply device (1) comprises said battery (3) and said monitoring circuit means (9), and said load (2) is not in said electrical energy supply device (1);
   b) supplying electrical power from the battery to the monitoring circuit means (9) in order to operate the monitoring circuit means (9) to detect and evaluate said operating variables of the battery; and
   c) disconnecting the electrical power supplied from the battery to said monitoring circuit means (9) to operate the monitoring circuit means (9) while said load (2) is shut off and thus not supplied with said electrical energy from said battery, so that the monitoring circuit means (9) is not supplied with the electrical power from the battery (3) and the discharge of the battery is slowed or prolonged while said load (2) is shut off.

2. The method as defined in claim 1, wherein said disconnecting of said power supply of said battery to said monitoring circuit means (9) is delayed with respect to shutting off the load (2) after the load is shut off.

3. The method as defined in claim 1, further comprising transmitting shut off information to said monitoring circuit means (9) in said electrical energy supply device (1) when said load (2) is shut off, and shutting off said electrical power supplied to said monitoring circuit means (9) from said battery immediately or after a predetermined time interval from a time at which said load (2) is shut off from the electrical energy in said battery (3) in response to said shut off information received in said monitoring circuit means (9).

4. The method as defined in claim 1, wherein an additional current conductor (10,12) connecting the load (2) to the monitoring circuit means (9) for the battery (3) is disconnected or interrupted immediately or with a time delay when the load (2) is shut off or disconnected from the battery (3).

5. The method as defined in claim 1, further comprising operating said monitoring circuit means (9) with a reduced power from said battery immediately after load shut off and, after a predetermined time interval during which said monitoring circuit means (9) is operated with said reduced power, shutting off said monitoring circuit means (9).

6. The method as defined in claim 1, wherein said load (2) consists of a hand tool machine and said hand tool machine comprises an electric motor (4) and control electronics (7) for said electric motor (4).

7. The method as defined in claim 3, wherein said load (2) comprises control electronics (7) and said control electronics (7) supply said shut off information to said monitoring circuit means (9).

8. A device for slowing discharge of a battery (3), said battery being arranged in an electrical energy supply device (1) for a load (2), when said electrical energy supply device is not operating to supply said load (2) with said electrical energy from the battery (3), said device comprising
   monitoring circuit means (9) for monitoring operating variables of said battery, said operating variables relating to an electrical energy supply in said battery (3), wherein said monitoring circuit means (9) is arranged within said electrical energy supply device (1) and said load (2) is not said electrical energy supply device (1);
   means for supplying said monitoring circuit means (9) with electric power from said battery (3) in order to operate said monitoring circuit means (9);and
   means (11, 13, 14) for disconnecting said electric power supplied from the battery to said monitoring circuit means (9) while said load (2) is shut off or not supplied with said electrical energy from said battery (3) so that the monitoring circuit means (9) is not supplied with said electric power from the battery and the discharge of the battery is slowed or prolonged.

9. The device as defined in claim 8, wherein said load (2) consists of a hand tool machine, said hand tool machine comprises an electric motor (4) and control electronics (7) for said electric motor (4) and said control electronics (7) provide load shut off information to said monitoring circuit means (9).

10. The device as defined in claim 8 or 9, wherein said load is not in said electrical energy supply device.

* * * * *